US012611765B1

(12) United States Patent
Boychuck et al.

(10) Patent No.: US 12,611,765 B1
(45) Date of Patent: Apr. 28, 2026

(54) MODULAR OMNIDIRECTIONAL ROBOTIC SYSTEM FOR NONPLANAR STRUCTURE NAVIGATION

(71) Applicants: William Lukac Yankanin Boychuck, Spencer, NY (US); Graham Michael Simons, Corning, NY (US); Paul Bennett Dohn, Corning, NY (US); Kyle Tavarez, Egg Harbor Township, NJ (US)

(72) Inventors: William Lukac Yankanin Boychuck, Spencer, NY (US); Graham Michael Simons, Corning, NY (US); Paul Bennett Dohn, Corning, NY (US); Kyle Tavarez, Egg Harbor Township, NJ (US)

( * ) Notice: Subject to any disclaimer, the term of this patent is extended or adjusted under 35 U.S.C. 154(b) by 0 days.

(21) Appl. No.: 19/378,386

(22) Filed: Nov. 4, 2025

Related U.S. Application Data

(60) Provisional application No. 63/716,439, filed on Nov. 5, 2024.

(51) Int. Cl.
| | |
|---|---|
| *B25J 9/16* | (2006.01) |
| *B25J 9/00* | (2006.01) |
| *B25J 9/08* | (2006.01) |
| *B25J 9/10* | (2006.01) |
| *B25J 19/00* | (2006.01) |

(52) U.S. Cl.
CPC .............. B25J 9/08 (2013.01); B25J 9/0009 (2013.01); B25J 9/102 (2013.01); B25J 9/1664 (2013.01); B25J 19/005 (2013.01)

(58) Field of Classification Search
CPC ... B25J 9/08; B25J 9/0009; B25J 9/102; B25J 9/1664; B25J 19/005
See application file for complete search history.

(56) References Cited

U.S. PATENT DOCUMENTS

| | | | | |
|---|---|---|---|---|
| 3,810,515 A | * | 5/1974 | Ingro ..................... | A63H 11/04 |
| | | | | 446/457 |
| 4,809,383 A | * | 3/1989 | Urakami ................... | B08B 1/32 |
| | | | | 15/385 |

(Continued)

OTHER PUBLICATIONS

Modular Pipe Climber (Year: 2019).*

*Primary Examiner* — Masud Ahmed
(74) *Attorney, Agent, or Firm* — Gugliotta & Gugliotta LPA

(57) ABSTRACT
A modular omnidirectional robotic system for navigating nonplanar structures including pipes, poles, chimneys, and trees. The system comprises multiple modules connected by hinges in an open C-shape configuration. Each module contains an omnidirectional drive mechanism with compliant treads, motors, batteries, and controllers. Adjustable tensioning mechanisms adapt to different structure diameters and enable both external and internal operation. The open configuration allows navigation around complex geometries including T-junctions, branches, and sharp bends by aligning the open section with obstructions. Sharp turns are negotiated using the leading edge of the drive mechanism as a pivot point. A control system coordinates module movement using sensors. The system operates on ferrous and non-ferrous materials, features an adaptable payload area for tools and sensors, and can be scaled by adding modules for larger structures.

20 Claims, 10 Drawing Sheets

(56) References Cited

U.S. PATENT DOCUMENTS

| | | | | |
|---|---|---|---|---|
| 7,210,364 B2* | 5/2007 | Ghorbel | F16L 55/26 | |
| | | | 73/865.8 | |
| 7,520,356 B2* | 4/2009 | Sadegh | B62D 53/00 | |
| | | | 180/164 | |
| 7,594,448 B2* | 9/2009 | Jacobson | F17D 3/08 | |
| | | | 73/865.8 | |
| 9,540,060 B2* | 1/2017 | Hutson | G05D 17/02 | |
| 2020/0088339 A1* | 3/2020 | Wehlin | G01N 29/225 | |
| 2021/0094186 A1* | 4/2021 | Wehlin | B25J 9/1694 | |
| 2021/0301847 A1* | 9/2021 | Makiura | F16B 9/058 | |
| 2024/0385144 A1* | 11/2024 | Al Brahim | G01N 29/225 | |

* cited by examiner

V1

V2

(B)

(A)

MODULAR OMNIDIRECTIONAL ROBOTIC SYSTEM FOR NONPLANAR STRUCTURE NAVIGATION

CROSS-REFERENCE TO RELATED APPLICATIONS

The present invention claims the benefit of U.S. Provisional Application No. 63/716,439, filed on Nov. 5, 2024 and incorporated by reference as if fully rewritten herein.

BACKGROUND OF THE INVENTION

1. Field of the Invention

The present invention relates generally to robotic systems and, more specifically, to a modular robotic system for inspecting, maintaining, and performing work on and within nonplanar structures capable of navigating various sizes of pipes, poles, chimneys, trees and branches, while overcoming obstacles including T-junctions, sharp turns, and complex geometries.

2. Description of the Related Art

Nonplanar structures such as pipes, poles, chimneys, trees and branches are ubiquitous in various industries including but not limited to oil and gas, power transmission, construction, and forestry. The inspection, maintenance, and performance of work on these structures pose significant challenges due to their often difficult-to-access locations, complex geometry, and the potential dangers involved in manual operations.

Current solutions for addressing these challenges include manual inspection methods, drone-based inspections, and various robotic platforms. Manual methods often involve scaffolding, rope access techniques, or the use of cherry pickers, which can be time-consuming, labor-intensive, and pose safety risks to workers. Drone-based inspections, while improving safety, are limited in their ability to perform physical tasks, limited in their payload capacity, and may have restricted use in enclosed spaces.

Existing robotic platforms for nonplanar structure navigation typically fall into categories such as magnetic crawlers, vacuum-based adhesion systems, or clamp-based climbing robots. However, these solutions are limited in terms of the materials they can operate on, their ability to navigate obstacles or complex geometries, and their adaptability to various structure sizes. For example:

U.S. Pat. No. 7,210,364, issued in the name of Ghorbel et al, titled "Autonomous robotic crawler for in-pipe inspection," describes a robot specifically designed for inspecting the interior of pipes and conduits. Such a robot for inspection is adapted to travel virtually unlimited distances through small-diameter enclosed spaces such as conduits or ducts, preferably using a fluid-driven screw-drive propulsion system. While this patent does not explicitly mention magnetic adhesion and exterior traverse, it does offer relevant insights into pipe inspection robots. And, while effective for ferrous materials, this solution is not suitable for non-ferrous pipes or other complex structures.

Also, U.S. Pat. No. 7,520,356, issued in the name of Sadede et al., discloses a "Modular wall climbing robot with transition capability" and teaches a mobile robot generally including suction modules on a support frame defining a vacuum chamber, and a vacuum unit supported on the support frame and communicating with the vacuum chamber. The vacuum unit includes a rotating impeller and an exhaust cowling surrounding the impeller. The impeller has an axis of rotation and is adapted to draw air from the vacuum chamber into the impeller in a direction generally parallel to the impeller axis of rotation and to discharge the drawn air in a direction substantially perpendicular to the impeller axis of rotation. The exhaust cowling is adapted to redirect the discharged air, whereby a thrusting force is applied to the support frame in a direction opposite of the direction of the drawn air from the vacuum chamber.

Other commercially available related art is also known. For example:

The VETOL robot by NEXXIS uses three tensioned tracks against the inner diameter to navigate vertical pipelines. It can carry multiple payloads. This model cannot easily rotate around the inner diameter of a pipe and it is unclear if it can negotiate a sharp turn.

The Sonomatic inspection used a large robot to scan gooseneck bends in underwater pipes. This robot seems to be built for this specific diameter of pipe and cannot be adjusted. It is unclear if the robot can transverse itself on the pipe or only the sensor. System is not modular and cannot navigate the inner diameter of a complex structure.

Also, GECKO Robotics uses magnetic components to adhere their climbers to ferrous materials. Since their robot uses magnets, they can navigate multiple sizes of structures without tensioning. Their robot would likely also be able to navigate the inner walls or diameter of a chimney or pipe. However, their technology can only be used on ferrous materials.

Further, a robot created by NEABOTICS can be delivered to industrial pipes via a drone to perform inspections. The climber works on both ferrous and non-ferrous materials as it seems to use a tensioning technique to adhere itself to the surface. It appears the robot is using a swerve drive mechanism to navigate horizontally, vertically, and circumferentially around the pipe. However, this robot is not modular and will likely only work on a small range in diameters of pipe. The robot also cannot navigate the inner diameter of sharp turns in piping, nor would it be able to navigate other complex geometries, such as a chimney. The robot would not be able to easily navigate the inner walls or diameter of a chimney or pipe.

Another technology, the KoalaLifter, wraps itself around a wind turbine in order to perform maintenance at elevated heights. This robot uses tension to maintain its height and can work on both ferrous and non-ferrous materials. This climbing technique would likely work on other complex geometries other than a cylinder, such as a chimney. However, this climbing technique does not use omni-directional wheels, and it can be argued this robot uses two similar "modules" to climb. However, it is unclear how this robot or a similar robot would be able to negotiate a sharp curve in the structure or a "T".

Yet another commercial device, the Omni-Crawler, utilizes an omnidirectional track that can both drive and roll, allowing for omnidirectional movement. This track is based on the omni-ball which was developed by Japan's Osaka University (OU). The omni-ball is built from two independent hemispheres that allow for each side of the ball to rotate independently. The tracks are used on a robot to transverse across planar structures. They are also used on the end of a gripper to manipulate an object after it has been picked up.

Also a differential swerve drive example developed by FIRST Tech Challenge robotics team 11115 Gluten Free uses two motors, a differential and a standard wheel to make an omnidirectional driving device. This technique avoids sacrificing traction as often is the case when using standard omnidirectional wheels such as mecanum wheels. Although other swerve drives exist, they are often bulky and are difficult to place in low-profile builds.

And finally, the MISTRAS ART Crawler provides a robotic platform for deploying sensors and other payloads to detect corrosion under insulation (CUI). This crawler appears to be able to work on different diameter pipes and structures. It appears the crawler can only function horizontally and seems to hold itself on the pipe using gravity. The system does not seem to be modular and would be unable to transition onto a vertical pipe.

Consequently, there remains a need for a versatile robotic system capable of navigating various sizes and materials of nonplanar structures, overcoming obstacles and complex geometries including T-junctions and sharp turns, and adapting to different tasks through modular design. Such a system would address the limitations of current solutions and provide a more efficient, safe, and cost-effective means of inspecting, maintaining and performing work on nonplanar structures across multiple industries.

SUMMARY OF THE INVENTION

It is thus an object of the present invention to provide a modular omnidirectional robotic system for transiting, navigating and performing work on the exterior and interior of nonplanar structures of various sizes, shapes and materials.

It is a further object of the present invention to provide a modular robotic system capable of overcoming obstacles and navigating complex geometries such as T-junctions, sharp turns, elbows, and branches on nonplanar structures.

It is still a further object of the present invention to provide a modular robotic system with adaptable payload capacity for carrying different tools or sensors as required for various tasks.

It is yet another object of the present invention to provide an improved open configuration design that enables the robotic system to navigate around obstacles, branches, struts, T-junctions and other complex geometric features in nonplanar structures by allowing the system to open and maneuver around such obstructions.

It is another object of the present invention to provide a robotic system capable of navigating sharp turns and bends in nonplanar structures by utilizing the leading edge of the omnidirectional drive mechanism as a pivot point.

The present invention provides a modular robotic system for nonplanar structure navigation. In preferred embodiments, the inventive system includes:

a) A plurality of similar modules, each comprising:
  i) An omnidirectional drive mechanism;
  ii) Multiple attachment points for placement of motors, batteries, motor controllers, microcontrollers, payloads or other accessories;
  EITHER:
  iii) A method for translating power from motor(s) or other power sources to the drive mechanism;
  OR
  iv) A method to have the omnidirectional drive mechanism to idle and be used as support;
b) Hinges connecting the modules in an open configuration;
c) Adjustable tensioning mechanisms for adapting to different structure sizes;
d) A control system for coordinating movement between modules;
e) A power system;

f) A payload area adaptable for various tools or sensors.

It is an advantage of the present invention that it provides a modular design allowing for adaptation to various sizes of nonplanar structures.

Another advantage of the present invention is that it features an open design, enabling navigation around obstacles, branches, struts, T-junctions or other complex geometric features in nonplanar structures.

It is an advantage of the present invention that it can navigate sharp turns and elbows on nonplanar structures, a capability not commonly found in existing robotic solutions.

It is another advantage of the present invention that it incorporates a dual movement system, allowing both vertical movement along or within the structure and rotation around or within its perimeter.

It is an advantage of the present invention that it utilizes a compliant omnidirectional drive mechanism and high-friction coating, providing better adaptation to surface irregularities and enhanced traction for increased payload capacity.

It is another advantage of the present invention that it offers a scalable payload capacity through the concept of stacking multiple systems to create a "sandwich" for payload placement in between the systems.

It is an advantage of the present invention that it can operate on both ferrous and non-ferrous materials, increasing its versatility across different types of nonplanar structures and use cases.

It is another advantage of the present invention that it employs a simpler design compared to many existing robotic platforms, potentially reducing manufacturing costs, improving reliability and permitting a scalable system size.

It is an advantage of the present invention that it features a payload area, allowing for the integration of various technologies, tools and sensors as required for different applications or jobs.

It is another advantage of the present invention that it can improve worker safety by reducing the need for human access to dangerous or hard-to-reach areas on nonplanar structures.

It is an advantage of the present invention that it offers the potential for more efficient and thorough inspections compared to manual methods or limited-mobility robotic solutions.

It is another advantage of the present invention that it utilizes off-the-shelf components where possible, potentially reducing costs and simplifying maintenance.

It is an advantage of the present invention that it incorporates sensors for precise movement control, allowing for future implementation of automated phase synchronization between modules.

It is another advantage of the present invention that it can be controlled remotely or via tether, enhancing operator safety and allowing for operation in confined or hazardous environments.

It is an advantage of the present invention that its design allows for future improvements, such as the planned implementation of mechanisms for automatic tension adjustment or robotic arms for tool manipulation at heights.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
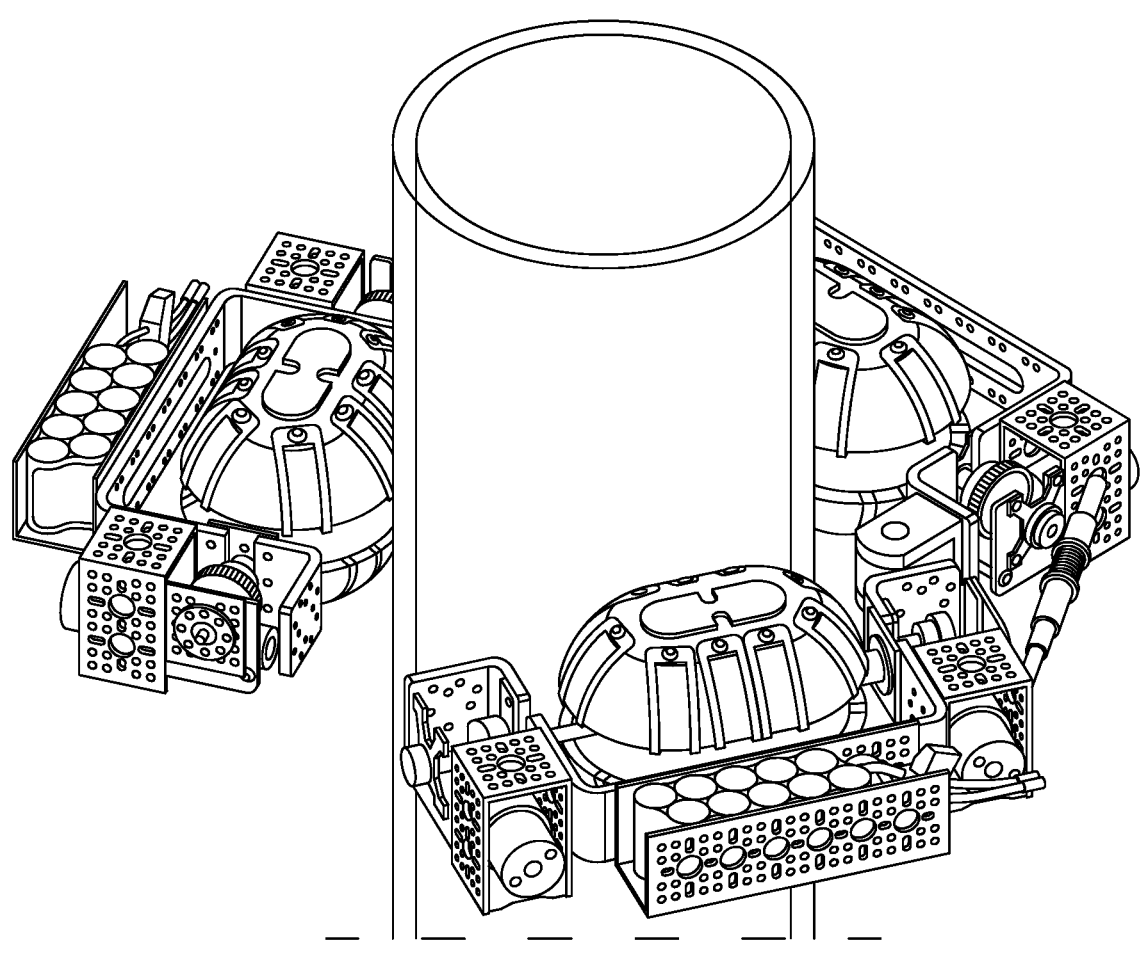
FIG. 1 is an overall view of the modular robotic system of the preferred embodiment of the present invention wrapped around a cylindrical structure.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. DETAILED DESCRIPTION OF THE FIGURES

Referring now to the drawings, wherein like reference numerals indicate the same parts throughout the several views, a modular robotic system, generally noted as 100, is provided. In reference to the Figures as a whole, the robotic system 100 may be formed of a number of individual modules. Preferably, the use of two or more coordinating and pivotally attached modules may be used to circumscribe about the outside circumference or inside surface of a nonplanar object, with more modules anticipated being used for larger sized structures. Each module is essentially similar to the others, with each module terminated at its lateral extreme with a hinge element for attachment to an adjacent module. As indicated, each module is essentially identical about a main chassis, with the difference between them being what is attached to either side.

Referring now to FIG. 1, an overview of the modular robotic system 100 is shown deployed on a cylindrical structure 150. The system comprises multiple identical modules 110, 120, 130 connected by hinges 115, 125 in an open configuration. Adjustable turnbuckles 140 allow the system to adapt to different diameters of cylindrical structures.

Figure 2:
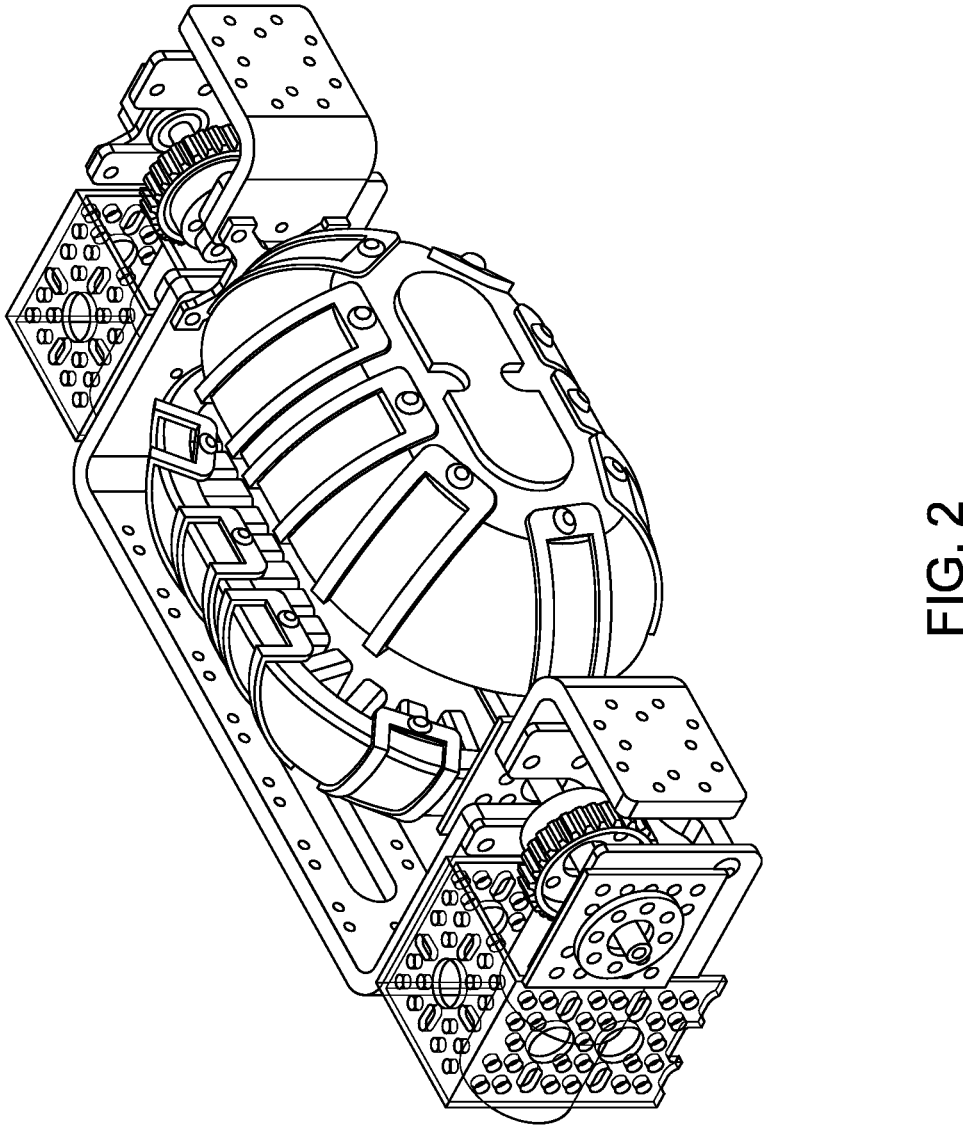
FIG. 2 is a detailed perspective view of a single module for use with the robotic system 10.

FIG. 2 provides a detailed view of a single module 200. This module 200 includes two motors: a drive motor 210 for movement along the cylindrical structure and a rotation motor 220 for circumferential movement. The compliant tread system 230 features treads with high-traction contact surfaces for enhanced traction.

Figure 3:
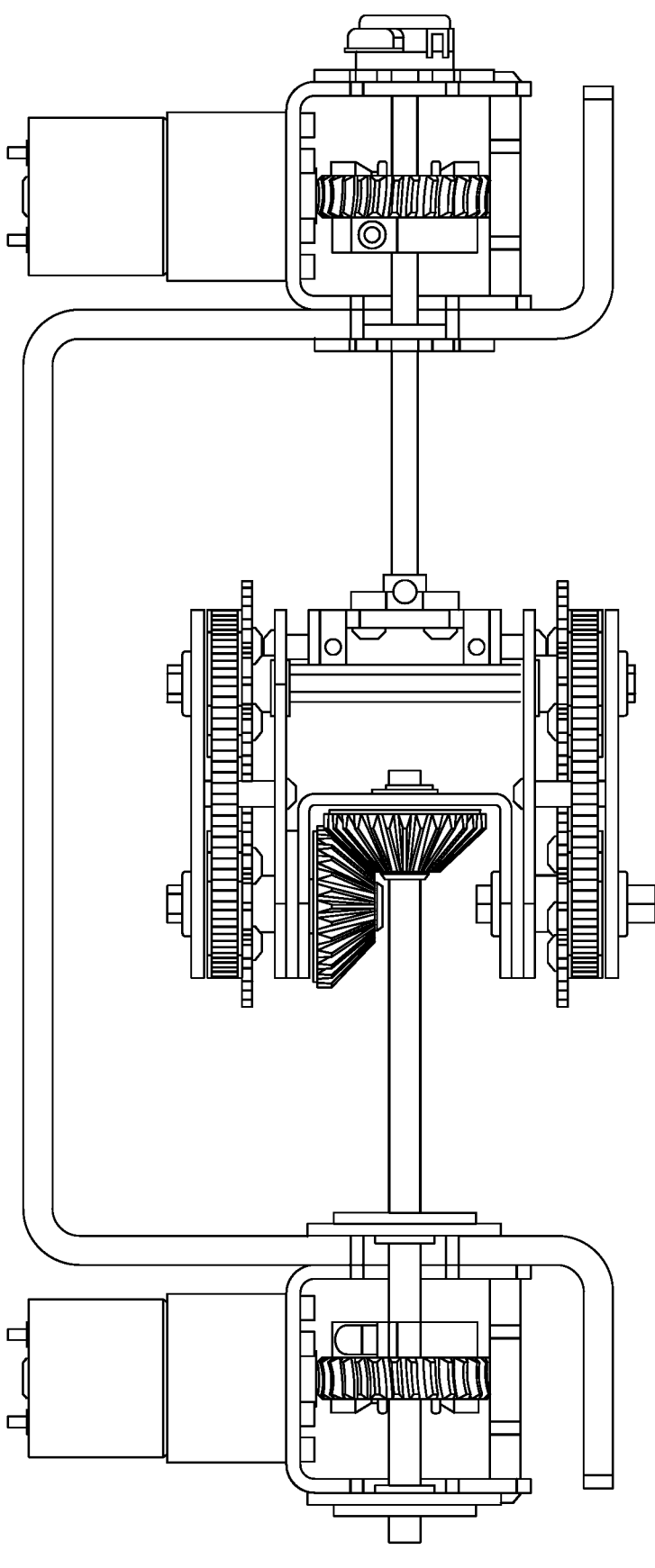
FIG. 3 is a schematic view detailing a bevel gear assembly for use inside each module, showing how the motor's movements get transferred to the treads using input and output gear.

FIG. 3 illustrates a bevel gear assembly 300 within each module, showing how motor movement is translated to tread movement. The assembly includes input gears 310, 320 connected to the motors, and output gears 330, 340 driving the tread system.

Figure 4:
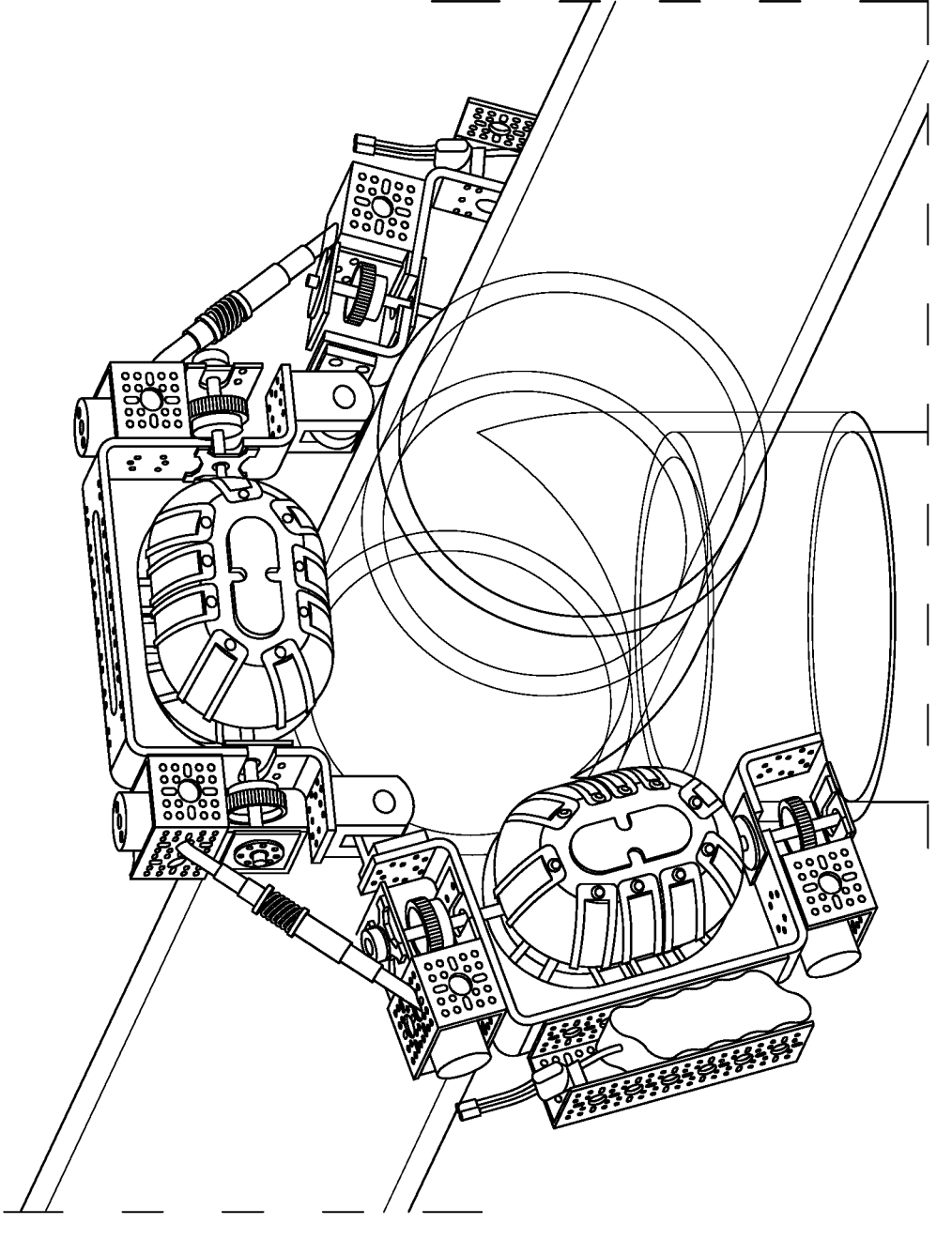
FIG. 4 is an illustration of how the system 10 maneuvers around a junction point, demonstrating the open C-shape configuration that allows navigation around T-junctions and obstacles.

FIG. 4 demonstrates the system's ability to navigate a T-junction 400 on a pipe. The open C-shape design allows the robot to maneuver around the junction point 410 without becoming stuck. This innovative feature enables the system to navigate complex piping systems and structures with branches or struts.

Figure 5:
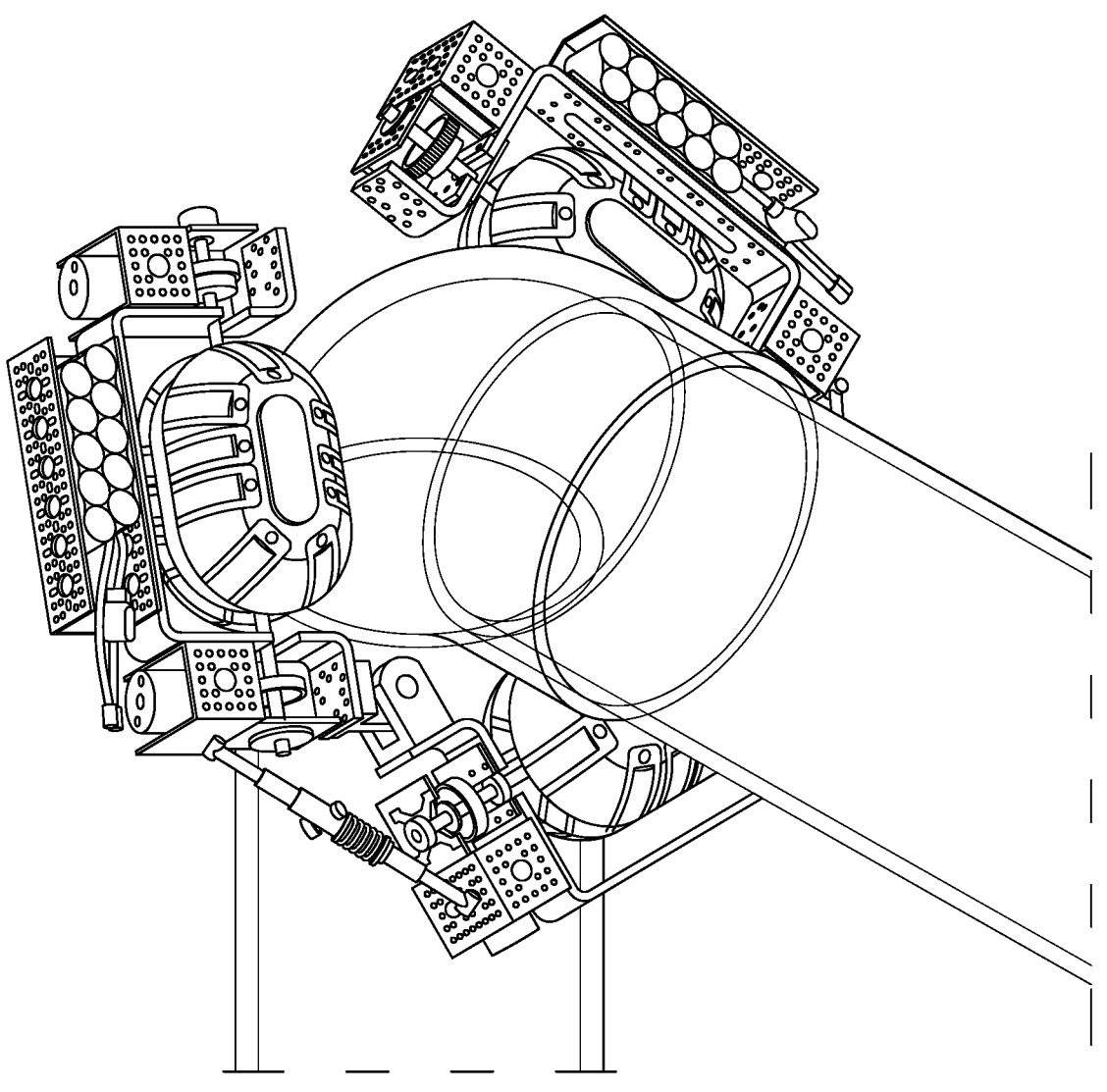
FIG. 5 is an illustration depicting the system 10 as it navigates a 90-degree elbow in a pipe, showing how the leading edge of the tread system acts as a pivot point.

FIG. 5 shows the robotic system transitioning around a 90-degree elbow 500 of a pipe. The leading edge of the tread system 510 acts as a pivot point, allowing the robot to navigate the sharp turn. This capability is particularly valuable for inspecting or maintaining piping systems with multiple bends.

Figure 6:
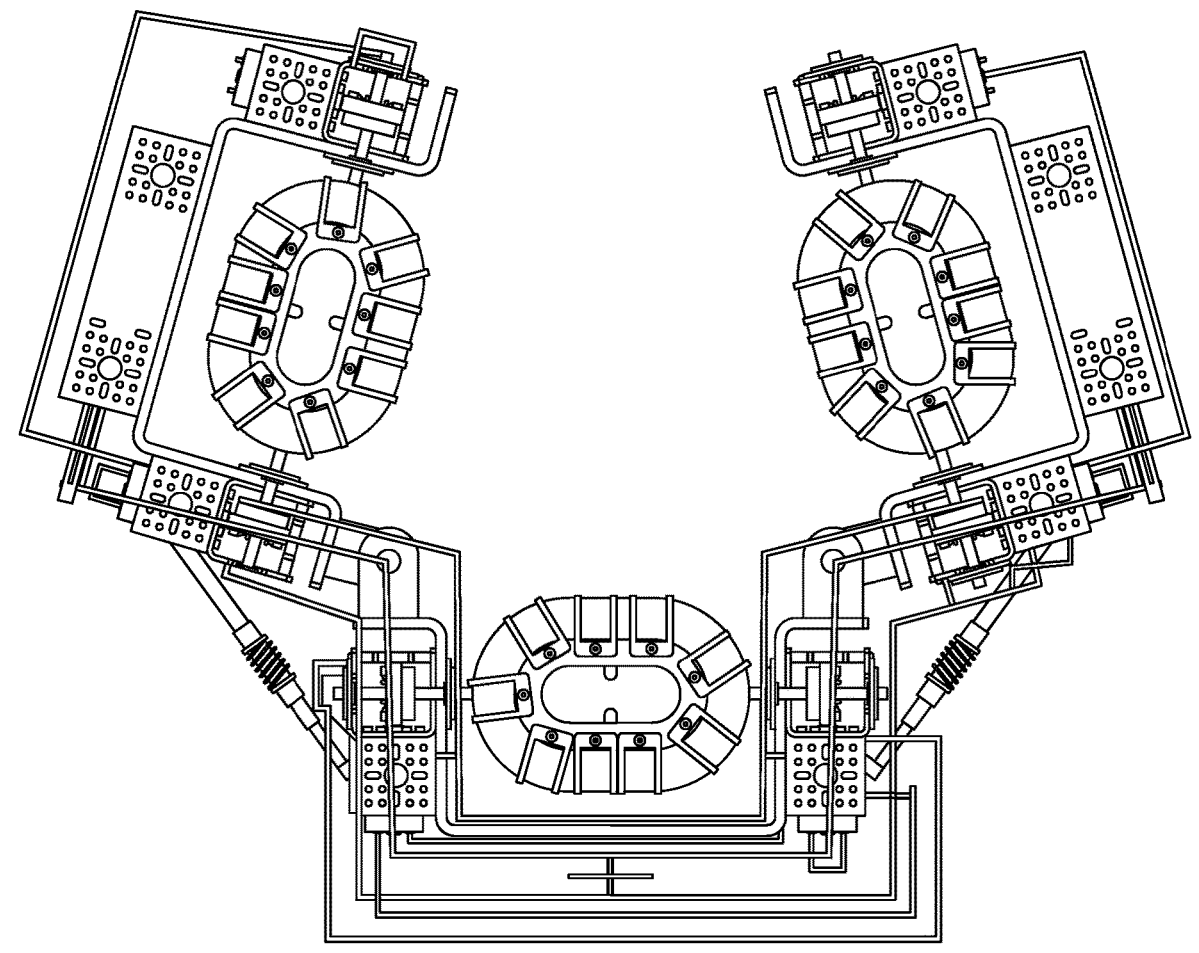
FIG. 6 is a block diagram showing control and power systems for use therewith, including a central processor and encoders for each module to manage coordinated movement, along with the layout of the batteries for balance.

FIG. 6 provides a block diagram of the control and power systems. The control system 600 includes a central processor 610 and encoders 620 for each module, ensuring coordinated movement. The power system 650 shows the arrangement of batteries 660 for optimal balance.

Figure 7:
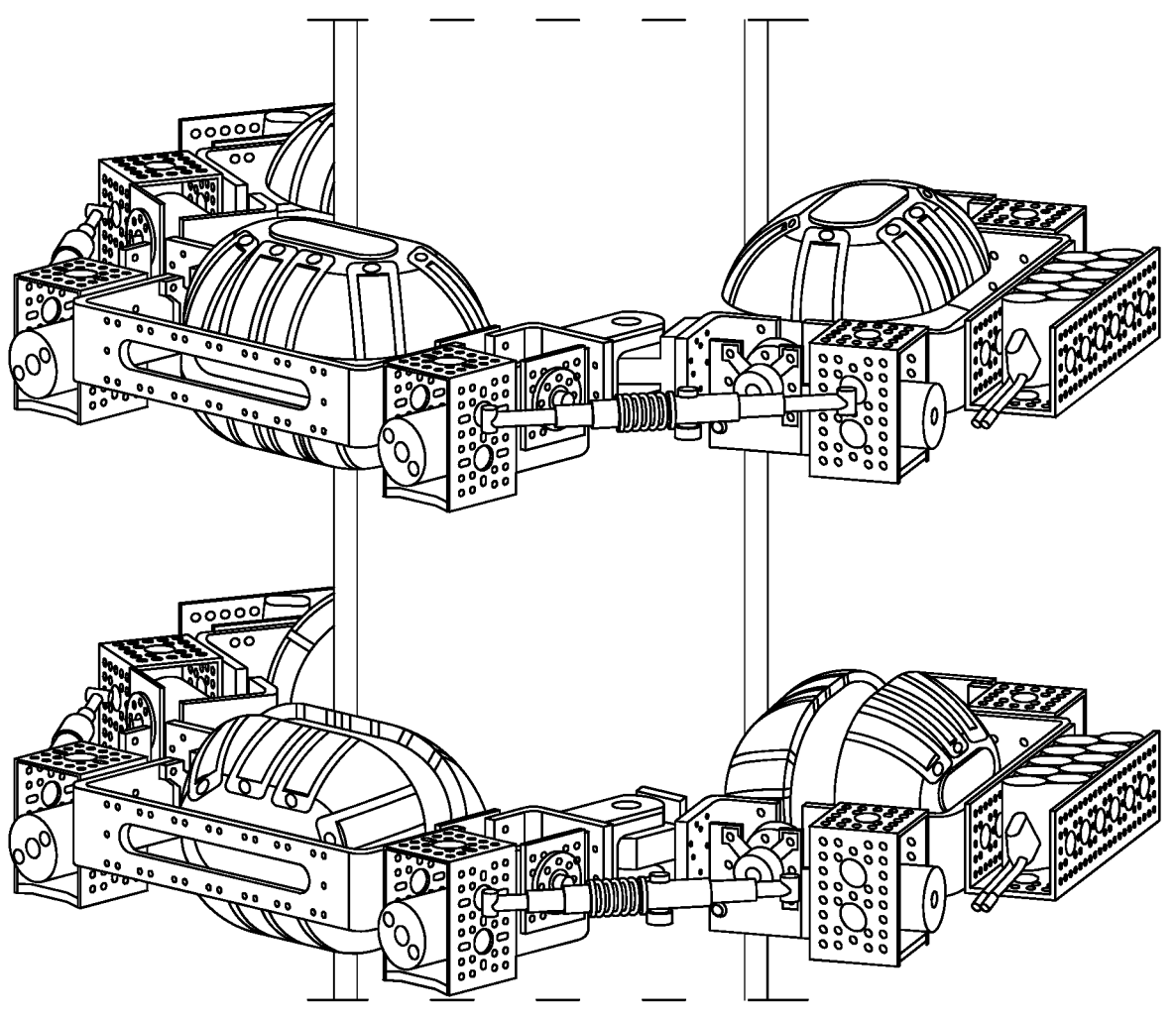
FIG. 7 shows a pair of such systems 10 illustrating the adaptable payload area on the system and the concept of stacking multiple systems for increased payload capacity.
Figure 8:
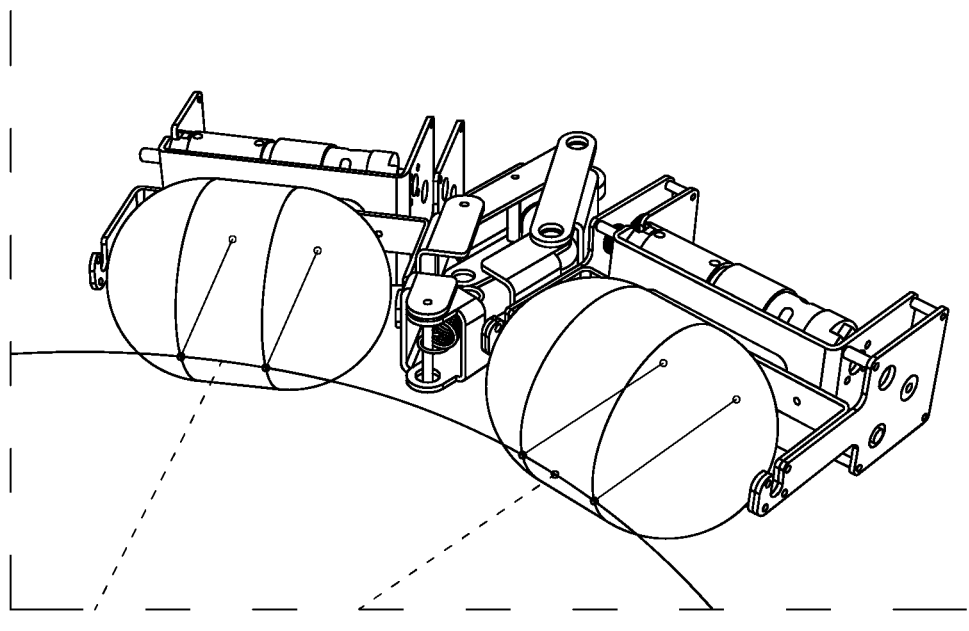
FIG. 8 is a perspective view of an alternate configuration of a single module for use with the robotic system 10.
Figure 9:
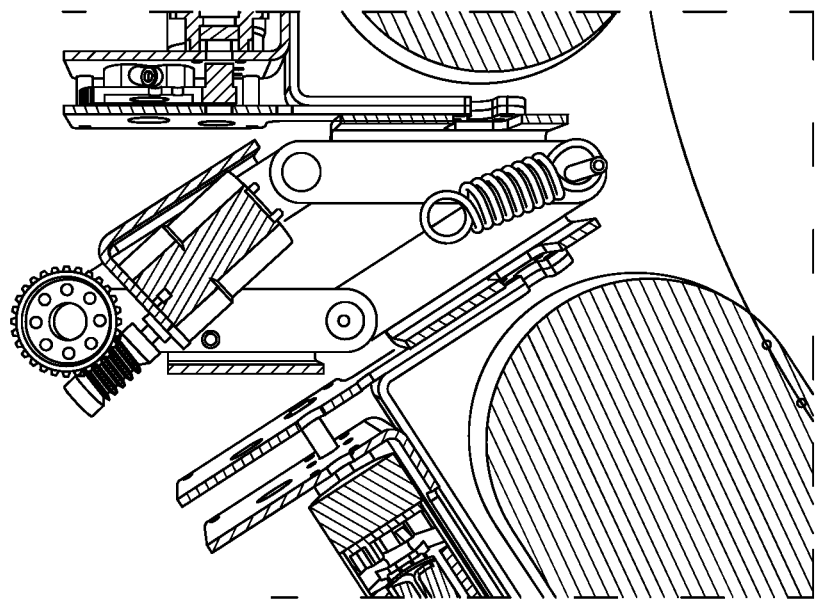
FIG. 9 is a schematic view showing an alternate hinge configuration for use therewith.
Figure 10:
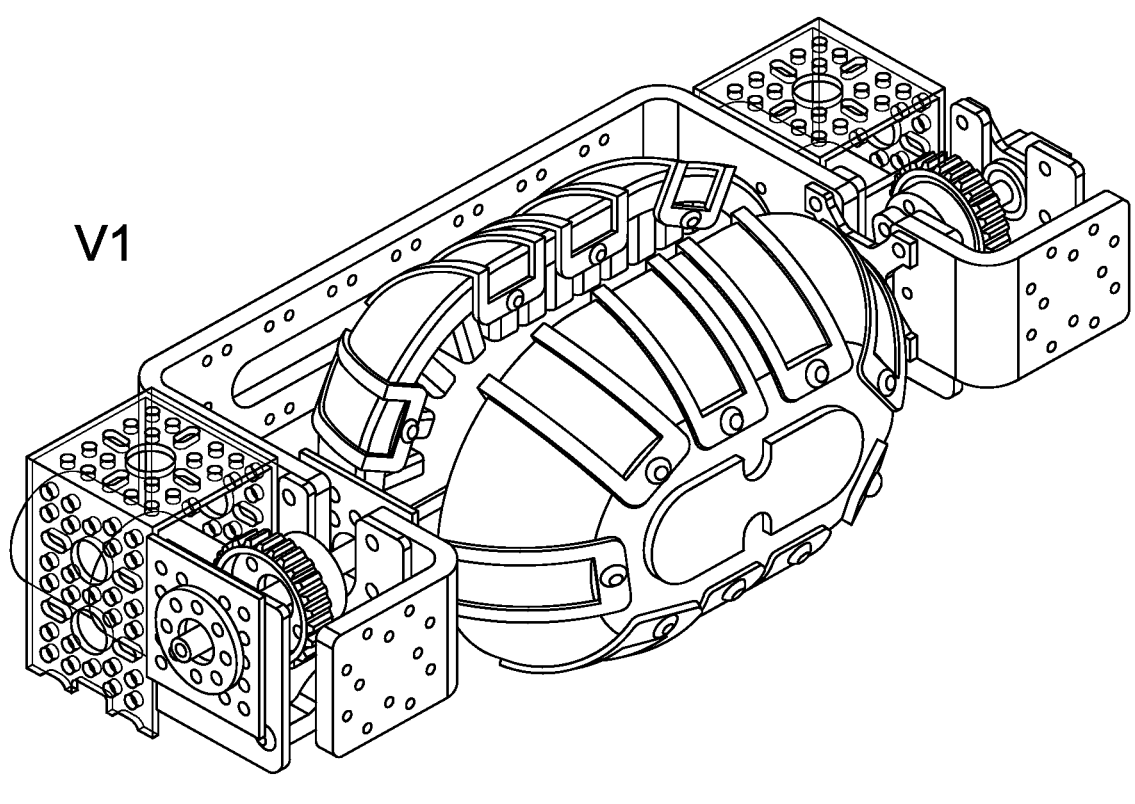
FIG. 10 is a top plan view thereof.
Figure 10:
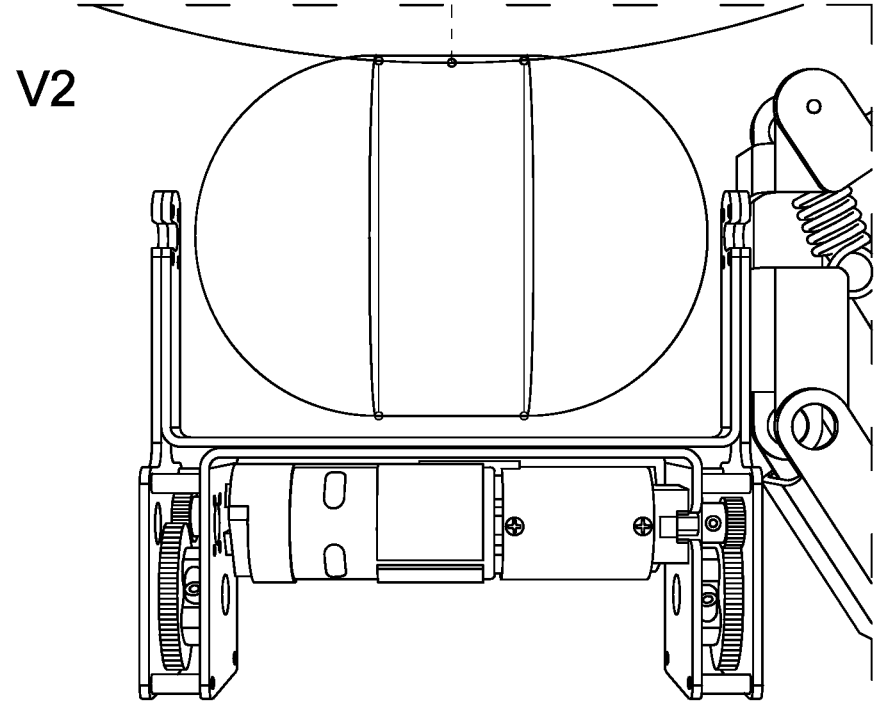
Figure 11:
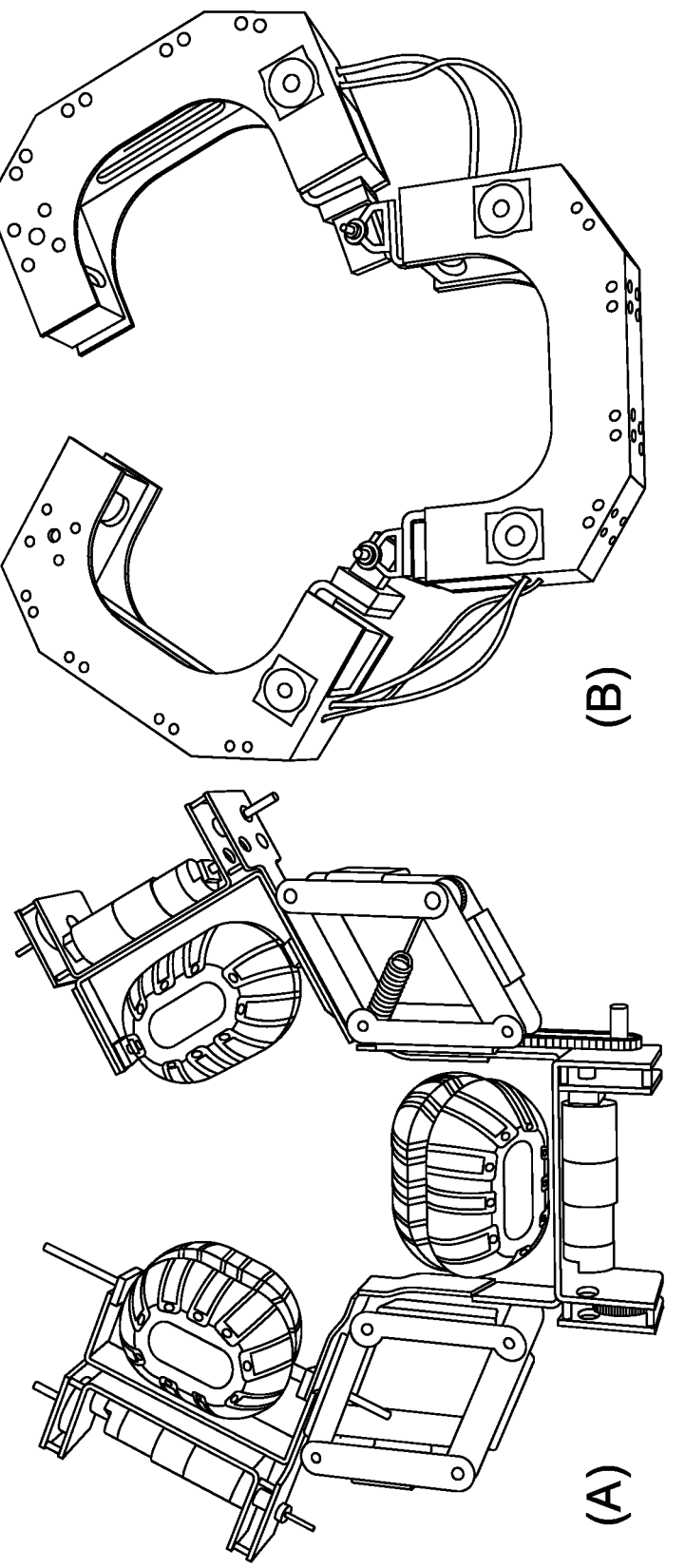
FIG. 11 is top plan photograph showing a comparison between the variant of FIG. 2 and the variant of FIG. 8.

FIG. 7 illustrates the adaptable payload area 700, which can be configured to carry various tools, sensors or other accessories 710 as required for different tasks. This figure also demonstrates the concept of stacking multiple systems for increased payload capacity, with an optional second robot shown for additional capacity.

In reference to the Figures as a whole, the robotic system 100 may be formed of a number of individual modules. Preferably, the use of two or more coordinating and pivotally attached modules may be used to circumscribe about the outside circumference or inside surface of a nonplanar object, with more modules anticipated being used for larger sized objects. Each module is essentially similar to the others, with each module terminated at its lateral extreme with a hinge element for attachment to an adjacent module. Each module contains an omnidirectional drive mechanism that can be powered or idle and used for support. As indicated, each module is essentially identical around a main chassis, with the difference between them indicated by what is attached to either side.

For example, and as shown, in one such module batteries may be mounted between the hinge points, with two hinges, one connected at each lateral end. Additional batteries may be provided and wired in parallel to power the motor controllers such that the entire robot system itself is powered. The system may be controlled by a controller. By way of example, and not meant as a limitation, a Bluetooth-compatible controller may be used as an "off the shelf" solution in order to control the motors to drive the assembly.

The controller may communicate to all of the motor controllers. Such controllers may preferably have two ports so that two motors may be connected to each motor controller. In this way, modules with two drive motors can use one main motor controller to control both motors independently. Each module can run off of two motors such that for each two motors and for each module there is one motor controller.

Currently, turnbuckles are used to connect the modules in order to apply tension about the perimeter of the nonplanar structure.

Currently, the preferred configuration is adapted to circumscribe an 8 to 12 inch diameter using three modules. However, for example, for use on a 24-inch pipe an additional module may be added, replace the battery mount with a hinge and then have the battery moved to the next module. The system may similarly be adapted for use with larger nonplanar structures by simply adding another module. This modular design allows for adaptation to various sizes and shapes of nonplanar structures.

As shown each module has a frame for supporting attachments. The battery mounts may be injection molded or 3D-printed plastic. The hinges may be made out of 3D-printed plastic with bearings press fit into them. However, specific materials of construction may be suitably adapted and, as such, should form no limitation on the scope of the present invention and replacement of materials should interchangeably be considered a functional equivalent.

Sensors are adapted such that they track the position of the module while in motion. For example, an encoder is required to synchronize all omnidirectional drive components while traveling vertically. This is to make sure that they are all in phase in the event that the system must travel circumferentially around a nonplanar structure.

The system's open configuration and modular design allow it to navigate both the exterior and interior of nonplanar structures. By reversing the tensioning method, the modules can be configured to apply force to the inner walls of a structure, enabling internal navigation using the same movement techniques as external navigation. This versatility allows the system to perform inspections and maintenance tasks in a wide range of scenarios, from external pipe inspections to internal chimney maintenance.

The batteries are purposefully positioned outside to counter the fact that this robot is open with a center of gravity placed outwards. With such a combination, the present assembly may navigate, for example, about a chimney with struts, a tree trunk and around tree branches or anything else that may be forming an intrusion. Such a configuration also allows for it to be able to navigate fittings, T-junctions and other obstructions formed in complex structures.

A significant improvement in the design is shown in an alternate configuration shown in FIG. 8 through FIG. 11, wherein an enhanced ability to navigate T-junctions and complex geometries exists. The open C-shape configuration allows the robot to: approach a T-junction or branch with the open section facing the obstruction; rotate around the structure to align the open section with the branch or junction; continue movement past the obstruction without collision; and re-establish full contact with the main structure after passing the obstruction.

This capability is achieved through the combination of: the open configuration design; coordinated motor control allowing independent module movement; the compliant omnidirectional drive mechanism that maintains contact while allowing flexibility; and strategic battery and component placement for optimal center of mass.

Similarly, for sharp turns and elbows, the system utilizes the leading edge of the omnidirectional drive mechanism as a pivot point. The process works as follows:

1. As the leading module approaches a sharp turn, it makes contact at the bend;
2. The leading edge of the tread maintains contact and acts as a pivot;
3. The control system coordinates the other modules to rotate around this pivot point; and
4. Once the leading module has navigated the turn, subsequent modules follow using the same technique.

The adaptable payload area allows for the integration of various tools, technologies or sensors, making the system versatile for different inspection or maintenance tasks.

2. OPERATION OF THE PREFERRED EMBODIMENT

Overlaying In operation, the modular robotic system is placed on a nonplanar structure with omnidirectional drive mechanism making contact. The adjustable tensioning methods are used to adapt the system to the structure's size. The control system coordinates the movement of all modules, allowing the robot to move along the structure or navigate around its perimeter as needed.

When encountering obstacles or complex geometries, the open design allows the robot to navigate around them. For T-junctions and branches, the robot can rotate to align its open section with the junction and continue movement. The open C-shape configuration is particularly effective for navigating T-junctions: the system approaches the T-junction while maintaining contact with the main pipe or structure; using coordinated motor control, the system rotates circumferentially to position the open section of the C-shape toward the branch connection; the modules continue to move forward, with the open section allowing clearance for the branch; and once past the junction, the system maintains its grip and continues operation.

For sharp turns and elbows, the robot can rotate to align its open section with the bend and use the leading edge of the omnidirectional drive system as a pivot point, enabling the robot to transition around the bend. The sharp turn navigation process works as follows:

As the leading module encounters the bend, the compliant tread system maintains contact with both the approach surface and the beginning of the turn. The leading edge of the tread acts as a pivot point. The control system coordinates the trailing modules to follow, each using the same pivoting technique. The encoders ensure synchronized movement to prevent binding or loss of traction. The adaptable payload area allows for the integration of various tools, technologies or sensors, making the system versatile for different inspection or maintenance tasks.

In some embodiments additional improvements may be incorporated, including:

Increased system voltage from 12V to 24V for improved power and speed;

New motor selection optimized for the higher voltage system;

Enhanced control system using WiFi connectivity through a router instead of Bluetooth, allowing for greater range and reliability;

PS5 controller integration for improved operator interface;

Phase control integration for the omnidirectional drive modules, enabling more precise synchronization;

Significantly improved modularity with hinges and drive modules connectable/disconnectable via 4 screws; and Reduced part count for improved reliability and easier maintenance.

These improvements enhance the system's capability to navigate complex geometries while improving overall performance, reliability, and ease of use.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722

(2002), or other similar caselaw or subsequent precedent should not be made if any future claims are added or amended subsequent to this Patent Application.

The invention claimed is:

1. A modular robotic system for navigating on and within nonplanar structures, comprising:
a plurality of similar modules, each module comprising:
an omnidirectional drive mechanism comprising a compliant tread with a high-traction contact surface;
multiple attachment points for strategic placement of an accessory selected from a group comprising: motor; battery; motor controller; microcontroller; sensor; and payload;
wherein the omnidirectional drive mechanism is configured to either translate power from at least one motor to provide active drive, or idle and provide passive support;
hinges connecting the modules in an open C-shape configuration;
adjustable tensioning mechanisms for adapting to different structure sizes,
wherein the tensioning mechanisms are reversible to enable operation on external surfaces or internal walls of nonplanar structures;
a control system for coordinating movement between the modules, the control system comprising sensors for each module to ensure coordinated movement; and
a power system with batteries strategically placed for balance, wherein placement of components is arranged to maintain a center of mass of the system proximate to a central axis of the nonplanar structure.

2. The modular robotic system of claim 1, wherein the adjustable tensioning mechanisms comprise turnbuckles or spring-loaded mechanisms.

3. The modular robotic system of claim 1, further comprising a payload area adaptable for various tools, technologies or sensors, wherein the payload area is configured to accommodate cameras, ultrasonic sensors, electromagnetic sensors, or mechanical manipulation tools.

4. The modular robotic system of claim 1, wherein the open C-shape configuration enables navigation around obstacles, branches, struts, and T-junctions on or within nonplanar structures.

5. The modular robotic system of claim 1, wherein the system is capable of navigating sharp turns and elbows on or within nonplanar structures by using a leading edge of the omnidirectional drive mechanism as a pivot point.

6. The modular robotic system of claim 1, wherein the system is capable of navigating T-junctions by rotating circumferentially to align an open section of the C-shape configuration with the junction, allowing clearance for the junction while maintaining contact with the nonplanar structure.

7. The modular robotic system of claim 1, wherein the system is capable of operating on and within both ferrous and non-ferrous materials.

8. The modular robotic system of claim 1, further comprising a remote control system for operating the robotic system from a distance, wherein the remote control system utilizes wireless or tethered communication.

9. The modular robotic system of claim 1, further comprising a scalable configuration wherein:
the plurality of similar modules is configured to accept additional modules connected via hinges to create an extended open configuration;

the adjustable tensioning mechanisms are configured to maintain proper tension when modules are added or removed; and the control system is configured to coordinate movement with any additional modules.

10. The modular robotic system of claim 1, wherein the omnidirectional drive mechanism of each module comprises at least one of:

vertical omnidirectional wheels configured for vertical movement along the nonplanar structure;

horizontal omnidirectional wheels configured for circumferential movement around the nonplanar structure;

an omnidirectional track system configured for both vertical and circumferential movement; or a differential drive system with bevel gears for translating motor power to the drive mechanism.

11. A method of navigating a nonplanar structure using a modular robotic system, the method comprising:

placing a modular robotic system on the nonplanar structure, the system comprising multiple modules connected in an open C-shape configuration;

adjusting the system to a size of the nonplanar structure using adjustable tensioning mechanisms;

coordinating movement between the modules using a control system with sensors on each module; and moving the system along or within the nonplanar structure using omnidirectional drive mechanisms.

12. The method of claim 11, further comprising driving the system circumferentially around a perimeter of the nonplanar structure.

13. The method of claim 11, further comprising navigating around a T-junction by:

rotating the system circumferentially to position an open section of the C-shape configuration toward the T-junction;

moving the system forward while maintaining contact with the nonplanar structure; and allowing clearance for the junction through the open section.

14. The method of claim 11, further comprising transitioning around a sharp turn or elbow by:

positioning a leading edge of the omnidirectional drive mechanism at the bend;

using the leading edge as a pivot point; and coordinating trailing modules to follow using synchronized movement.

15. The method of claim 11, wherein the system operates on at least one of an external surface or an internal wall of the nonplanar structure by reversing a direction of the adjustable tensioning mechanisms.

16. A modular robotic module for use in a nonplanar structure navigation system, comprising:

an omnidirectional drive mechanism with a compliant tread having a high-traction contact surface;

multiple attachment points for strategic placement of motors, batteries, motor controllers, microcontrollers, sensors, or payloads;

a power transmission system configured to translate power from at least one motor to the omnidirectional drive mechanism, or alternatively configured to allow the omnidirectional drive mechanism to idle and provide passive support;

hinges for connecting to other modules in an open C-shape configuration; and sensors for coordinating movement with other modules.

17. The modular robotic module of claim 16, further comprising a portion of an adjustable tensioning mechanism for adapting to different structure sizes.

18. The modular robotic module of claim 16, wherein the omnidirectional drive mechanism comprises a differential drive system with bevel gears configured to provide both vertical movement along a structure and circumferential movement around the structure.

19. A system for inspecting or maintaining nonplanar structures, comprising:

the modular robotic system of claim 1; and at least one tool or sensor attached to a payload area of the modular robotic system, wherein the at least one tool or sensor is selected from a group consisting of cameras, ultrasonic sensors, electromagnetic sensors, and mechanical manipulation tools.

20. The system of claim 19, wherein the modular robotic system is configured to stack with at least one additional modular robotic system to create increased payload capacity between the stacked systems.

* * * * *